United States Patent [19]
Duff

[11] Patent Number: 4,467,259
[45] Date of Patent: Aug. 21, 1984

[54] SLIP ENERGY RECOVERY CONTROL SYSTEM USING HYBRID INVERTER TO IMPROVE QUADRATURE CURRENT CONSUMPTION

[75] Inventor: David L. A. Duff, Burlington, Canada

[73] Assignee: Rumble Equipment Limited, Rexdale, Canada

[21] Appl. No.: 483,817

[22] Filed: Apr. 11, 1983

Related U.S. Application Data

[63] Continuation-in-part of Ser. No. 411,847, Aug. 26, 1982.

[51] Int. Cl.³ .............................................. H02P 5/40
[52] U.S. Cl. .................................... 318/800; 318/803
[58] Field of Search .............................. 318/757–764, 318/800–811, 743

[56] References Cited

U.S. PATENT DOCUMENTS

| | | | |
|---|---|---|---|
| 4,319,177 | 3/1982 | Kawada et al. | 318/803 |
| 4,344,026 | 8/1982 | Yoshiaka | 318/806 |
| 4,385,267 | 5/1983 | Herbert et al. | 318/762 |

Primary Examiner—J. V. Truhe
Assistant Examiner—A. Evans
Attorney, Agent, or Firm—Sim & McBurney

[57] ABSTRACT

A hybrid inverter for a slip energy recovery system for a wound rotor motor employs six thyristors (for 3 phase operation) or equivalent devices. Three of these are operated continuously in the inversion mode, the other three being operated from zero degrees to 180 degrees. The result is that a characteristic that is identical to a semi-converter is obtained except in the inversion mode. The hybrid inverter produces zero quadrature current at the full speed of the wound rotor motor and, as desired, zero volts at maximum current and maximum volts at zero current.

9 Claims, 19 Drawing Figures

6-PULSE CONVERTER
(RECTIFIER OR INVERTER)

VARIABLE HALF

SEMI-CONVERTER
(RECTIFIER ONLY)

FIXED HALF (DIODES)

VARIABLE HALF

HYBRID INVERTER
(INVERTER ONLY)

FIXED HALF (INVERTING SCRS)

ered power was dissipated in adjustable resistor banks or in large liquid-cooled rheostats, an obviously wasteful use of the power. Subsequently, slip energy recovery (SER) systems were developed making it possible to recover the previously wasted power inverting it back to 60 Hz AC power and returning it to the power source for the motor through a voltage matching transformer.

SLIP ENERGY RECOVERY CONTROL SYSTEM USING HYBRID INVERTER TO IMPROVE QUADRATURE CURRENT CONSUMPTION

CROSS-REFERENCE TO RELATED APPLICATIONS

This is a continuation-in-part of application Ser. No. 411,847 filed Aug. 26, 1982.

BACKGROUND OF THE INVENTION

This invention relates to systems for changing the speed of a wound rotor motor and recovering the slip energy thereof, the former being achieved by removing controlled amounts of power from the rotor of the wound rotor motor and the latter by returning the removed power to the power source for the wound rotor motor.

It is well known that the speed of a wound rotor motor can be adjusted by changing the power flow through the rotor circuit of the motor. With early wound rotor motor speed controls the removed power was dissipated in adjustable resistor banks or in large liquid-cooled rheostats, an obviously wasteful use of the power. Subsequently, slip energy recovery (SER) systems were developed making it possible to recover the previously wasted power inverting it back to 60 Hz AC power and returning it to the power source for the motor through a voltage matching transformer.

Slip energy recovery systems have been employed in North America for about ten years. Prior art systems presently marketed share a common problem, particularly as the system becomes a large part of the total installed electrical load. Thus, due to the characteristics of the line-commutated inverter employed in the SER system, the reactive current drawn from the supply when the motor is operating at full speed and full load is equal to the full-load motor current, resulting in a total KVA draw from the supply that is almost double the normal full-load value. Fortunately this can be reduced to normal values by connecting power factor correction capacitors across the system input, these being equal in rating to the full KVA rating of the motor.

While the use of power factor correction capacitors reduces the full speed KVA to more normal proportions, it introduces other problems with potentially greater impact on the system. These include:

(a) A leading power factor at speeds below 75% resulting in supply system instabilities, particularly in the presence of emergency diesel-driven standby power generators.

(b) A large capacitive standby current when the motor is not actually running.

(c) Harmonic pollution of the supply caused by resonance of the large capacitive component with the supply impedance (inductive reactance) with resulting higher voltages, system overloads, capacitor fuse operation and magnetic saturation.

By way of elaborating on the foregoing, if the SER system becomes a large part of the total electrical load, which may be, for example, a complete pump house having lights, heaters, fixed speed drives etc. in addition to SER systems, the AC transformer supplying power to the pump house will have a large inductance that will resonate with the large power factor correction capacitors at a harmonic (the 5th) that is the same as that of the inverter-rectifier subsystem of the SER system. Also, if the AC supply should be lost, power then may be supplied on an emergency basis from a diesel generator. At this point the wound rotor motor is not operating. When the diesel motor gets up to speed, the correct field is supplied to the generator driven by it to give the required voltage, and when this generator is connected to the system the result is a leading current to supply the large power factor correction capacitors. This creates an unstable generator because the field of the generator becomes self-exciting. The same thing can happen if the system is being supplied from a diesel generator and the speed of the wound rotor motor is reduced, i.e., depending on the extent of the speed reduction, a leading power factor can result.

A number of methods have been employed to limit the effect of the large power factor correction capacitors employed with SER systems including switching banks of capacitors onto the system as the motor load is increased and switching them off again as the load decreases. This solution sharply increases the cost of the overall system, decreases its reliability due to the increased mechanical stress on the switching contactors and generates undesirable switching transients on the system supply.

SUMMARY OF THE INVENTION

An object of an aspect of this invention is to reduce the amount of system power factor correction required in an SER system to eliminate or reduce the severity of the aforementioned problems of prior art SER systems.

In accordance with one aspect of this invention there is provided a slip energy recovery system for a wound rotor motor having an AC supply source of at least one phase, said system including rectifying means and a hybrid inverter each having the same number of phases as said source connected between the wound rotor of said motor and said source for converting AC power from said rotor to DC power and for inverting said DC power to AC power for delivery to said source, said hybrid inverter including in each phase thereof first and second groups of gate-controlled, bistable, unidirectional conducting devices; and means for controlling the operation of said first and second groups of bistable unidirectional conducting devices in each said phase of said hybrid inverter such that said first bistable unidirectional conducting device group is continuously in the inversion mode and gated into conduction at a fixed firing angle while said second bistable unidirectional conducting device group is gated into conduction at a firing angle of from 0° to 180°, whereby said hybrid inverter produces zero quadrature current at full speed of said motor, zero volts at maximum motor current and maximum volts at zero motor current.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING PREFERRED EMBODIMENTS

An examination of the slip energy generated at the slip rings of a wound rotor motor as the speed is varied from zero to full speed reveals that there is no slip energy generated at full speed. In addition, when the motor is driving a centrifugal load, such as a fan or pump, the slip energy reaches a maximum value at 66% speed and reduces to zero at zero speed. On the other hand, the current which is directly proportional to torque, is maximum at full speed and decreases as a square function of speed to zero at zero speed. It is this current which is required to produce full load torque at full speed but which contains no power, that requires compensation.

Further examination of the slip ring voltage vs. speed characteristic reveals that the voltage at full speed is zero and is maximum at zero speed. The line-commutated inverter (FIG. 2(a)) must be operated at a "firing angle" of 90 degrees (lagging) to achieve zero volts. At this operating point the inverter is operating just between the inverting and rectifying mode carrying full current but producing an average of zero volts at its terminals.

Figure 2A:
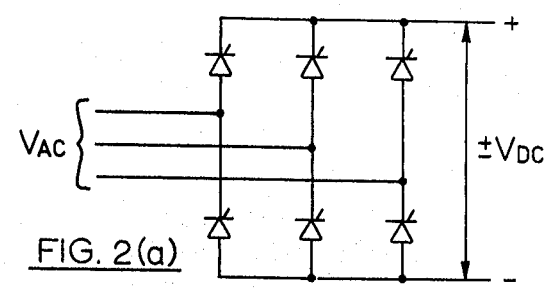
FIG. 2(a), FIG. 2(b) and FIG. 2(c) illustrate various three-phase converter bridge configurations, FIG. 2(a) and FIG. 2(b) being prior art configurations.
Figure 2B:
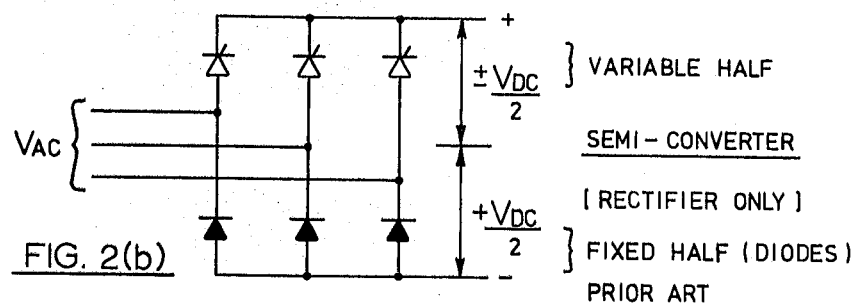

Another rectifier configuration (FIG. 2(b)) commonly employed in the DC drive field is the semi-converter or hybrid bridge. This configuration employs three thyristors and three diodes to produce a full range of DC voltage from zero to maximum by varying the "firing angle" from 0° to 180°. The circuit is limited in operation to the rectifier quadrant, since inversion is not possible with the rectifier diodes in the circuit.

If one examines the operation of the semi-converter, it can be imagined as two rectifiers connected in series, one being a fixed voltage diode rectifier producing a voltage of $+VDC/2$ and one being a variable voltage thyristor inverter operating from $-VDC/2$ to $+VDC/2$. At full output the two rectifiers add resulting in $+VDC$ at the output. At minimum output the rectifier produces $+VDC/2$ and the converter produces $-VDC/2$ resulting in zero net output voltage. Because the thyristor portion operates over a 180° firing angle and produces only ½ the output, the power factor variation from zero to full output is considerably less than that of the six thyristor converter equivalent. In fact, at zero volts the quadrature current drawn from the line is zero, in comparison to the full converter which draws maximum quadrature current at zero volts.

Figure 2C:
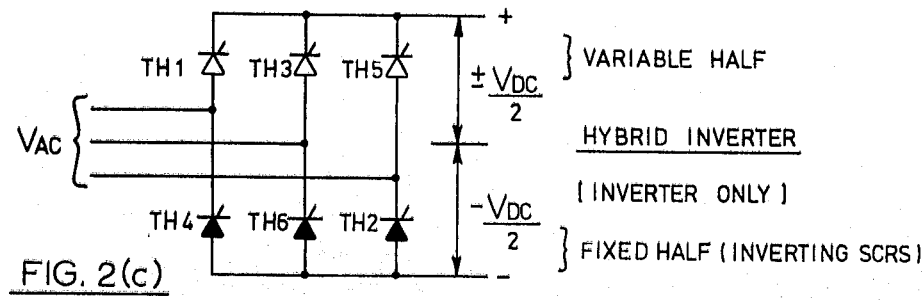

By replacing the three diodes with three thyristors a full converter bridge is obtained, as shown in FIG. 2(c). However, if the three thyristors replacing the diodes now are operated continuously in the inversion mode, while the other three thyristors are operated from 0° to 180°, a characteristic identical to the semi-converter is obtained, except in the inversion mode.

This means that at full speed where the full converter (FIG. 2(a)) produces maximum quadrature current, the hybrid inverter produces zero quadrature current, but does possess the required characteristics for operating as an SER system; i.e., (1) zero volts at maximum current, and (2) maximum volts at zero current and, in addition, does not draw any supply current at full speed. The characteristics of the SER system employing a hybrid inverter at full speed then match those desired since no power factor compensation is required at full speed. This can best be seen by considering FIG. 3.

Figure 3:
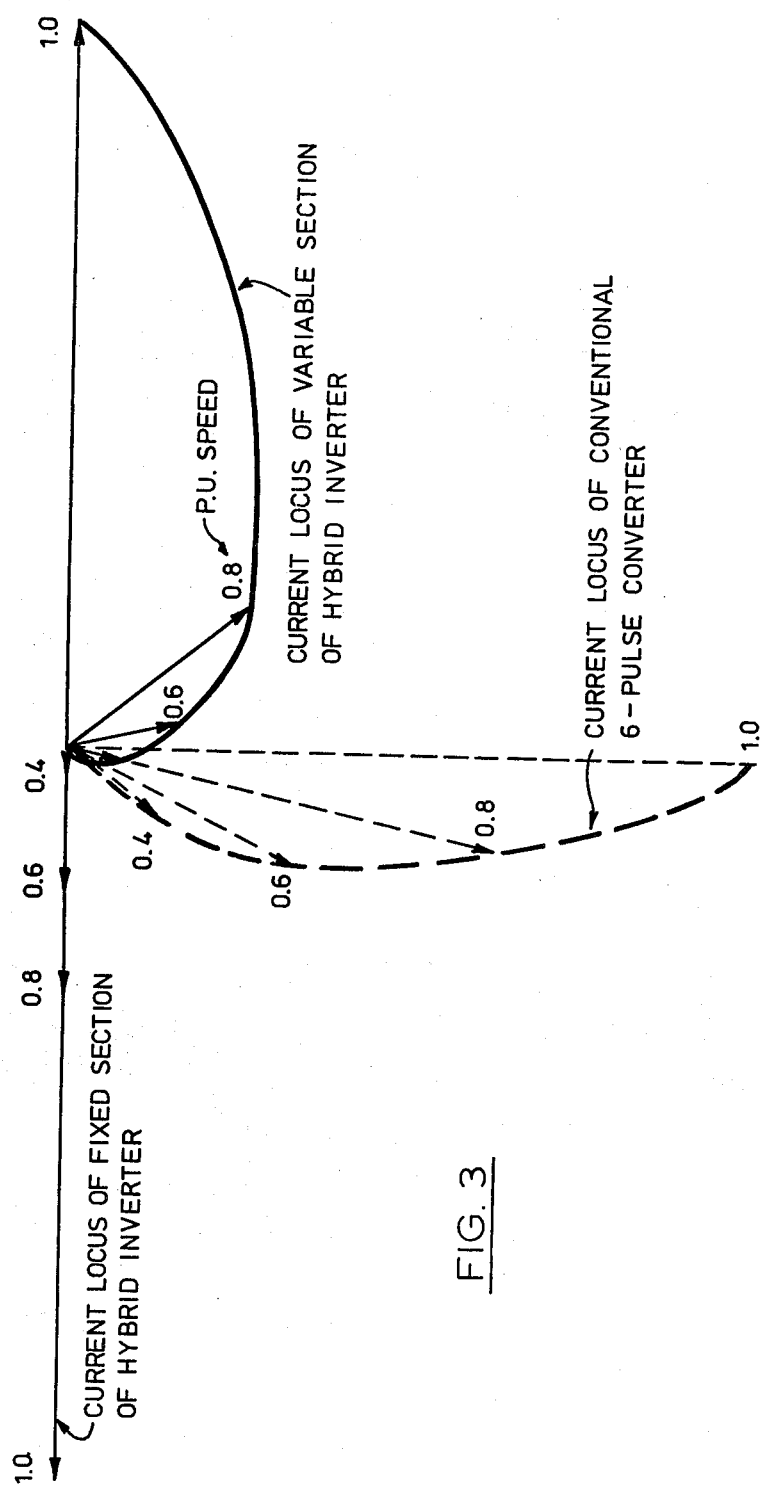
FIG. 3 is a vector diagram of the current of an SER system comparing that of a conventional system to that of the system of the present invention.

As the speed is reduced, however, more quadrature current is drawn reaching a maximum at about 80% speed (see FIG. 3). This maximum value is only 25% of the total current drawn at full speed and may be fully compensated with 25% of the compensation required with a full converter (FIG. 2(a)). In addition, the system power factor will always be lagging, as may be seen from FIG. 3, eliminating instability problems with the power system.

Figure 4:
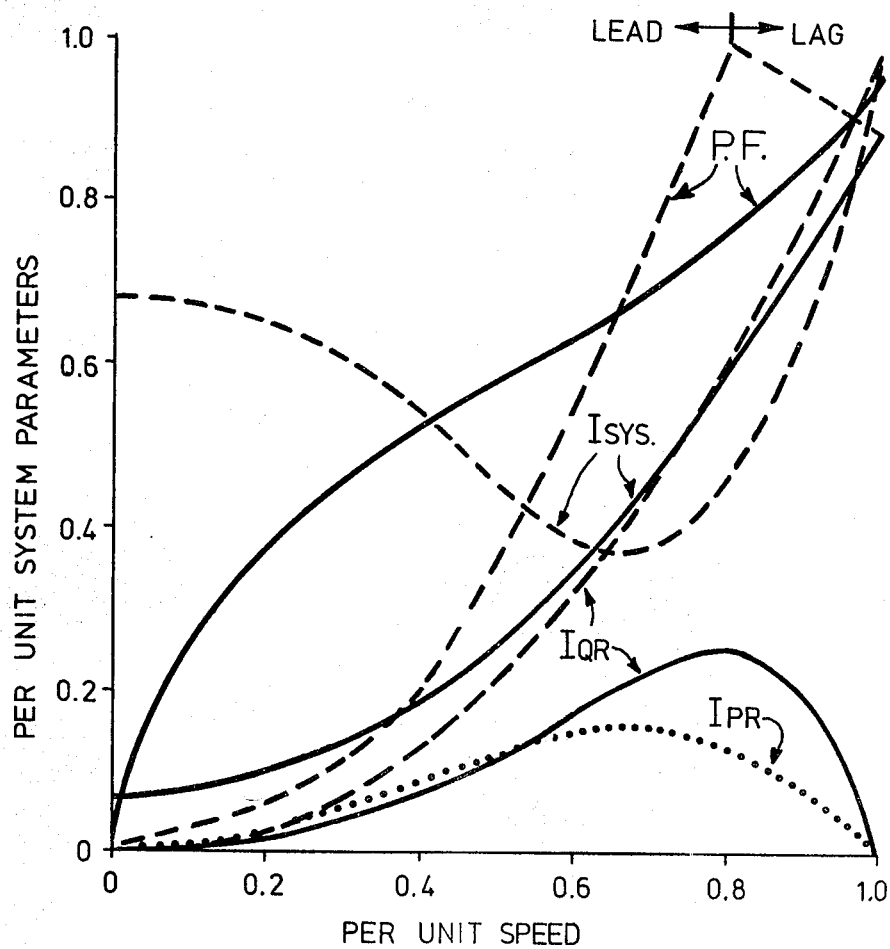
FIG. 4 is a graph showing various system parameters plotted against speed for both a conventional SER system and one embodying the present invention.

FIG. 4 compares the essential operating parameters of a conventional SER system and one embodying the present invention as a function of speed.

It should be apparent from the foregoing that the essence of the present invention is the employment of a hybrid inverter that includes in each phase thereof first and second groups of gate-controlled, bistable, unidirectional conducting devices, e.g., thyristors and controlling the operation thereof such that in each phase the first group is operated continuously in the inversion mode while the second group is operated from 0° to 180°. This contrasts with the superficially similar full converter of FIG. 2(a) wherein all of the six thyristors always are fired at the same phase retardation angle and, depending upon the phase retardation angle, the converter operates in the rectifier mode ($\pm$) or the inversion mode ($\mp$).

A control logic system is required in order to operate the hybrid inverter of the present invention, just as a control logic system is required to operate the full converter shown in FIG. 2(a). One such control logic system now will be described, but it is to be understood that it is illustrative only of a suitable system, although it contains numerous innovations itself, and that other control logic systems may be employed without departing from the present invention as broadly described hereinbefore.

The requirements of a hybrid inverter (FIG. 2(c)) control logic are different from those of a full converter (FIG. 2(a)) or a semi-converter (FIG. 2(b)) in that, while six gating signals are required, the positive and negative thyristor banks are controlled independently. A desirable attribute of the gating circuit is one whereby the relationship between the logic control signal and the terminal DC voltage of the hybrid inverter is linear to permit optimal control system operation. The further requirement to reduce the terminal voltage to its minimum value at the full speed operating condition of an SER system necessitates special limiting techniques to provide this condition. In addition are the stringent requirements of maintaining sufficient commutation angle during full inversion operation of the negative thyristor bank.

To provide system stability and protection, it is necessary to monitor and control the DC current flowing through the hybrid inverter. While this may be accomplished with a resistive shunt in the DC path, this method precludes electrical isolation from the high voltage DC power bus, i.e., the DC terminals of the hybrid inverter. It is desirable to use current transformers on the AC side of the hybrid inverter, but this cannot be done because of the assymetrical nature of the hybrid inverter thyristor bank gating control.

The control logic system hereinafter described is, as aforementioned, innovative in itself and is designed to accurately model the DC bus current in a hybrid inverter, while maintaining electrical isolation from the power system; and to provide means for limiting the phase advance and phase retard angles of the gating control independently but reliably, independently controlling the positive and negative thyristor banks to provide hybrid inverter operation.

CURRENT MONITOR

Figure 5A:
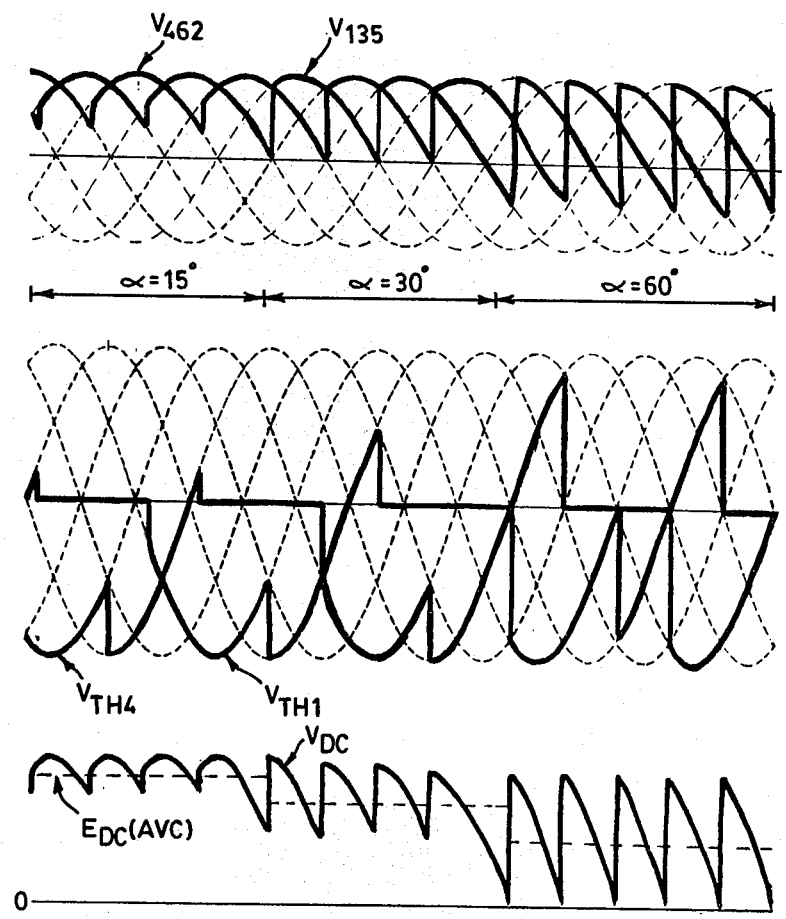
FIG. 5(a) and FIG. 5(b) show the AC supply current waveforms for the 6-pulse converter of FIG. 2(a) for phase retardation angles varying from 15° to 165° with a constant direct current flowing.
Figure 5B:
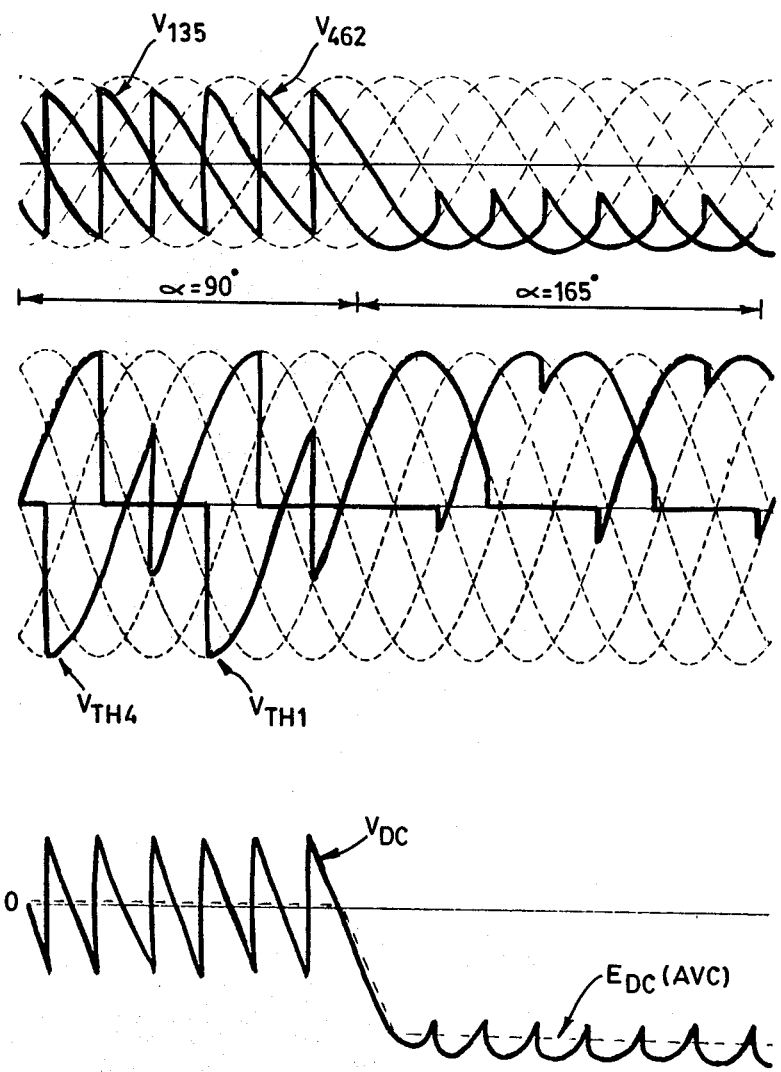
Figure 5C:
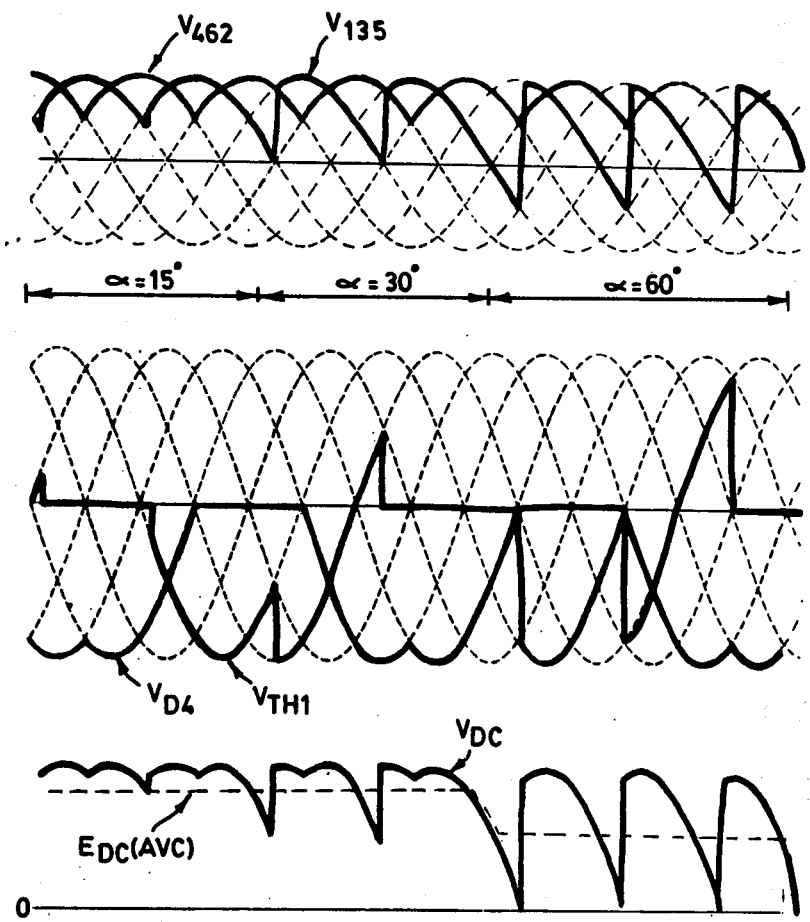
FIG. 5(c) and FIG. 5(d) show the AC supply current waveforms for the semi-converter of FIG. 2(b) for phase retardation angles varying from 15° to 165° with a constant direct current flowing.
Figure 5D:
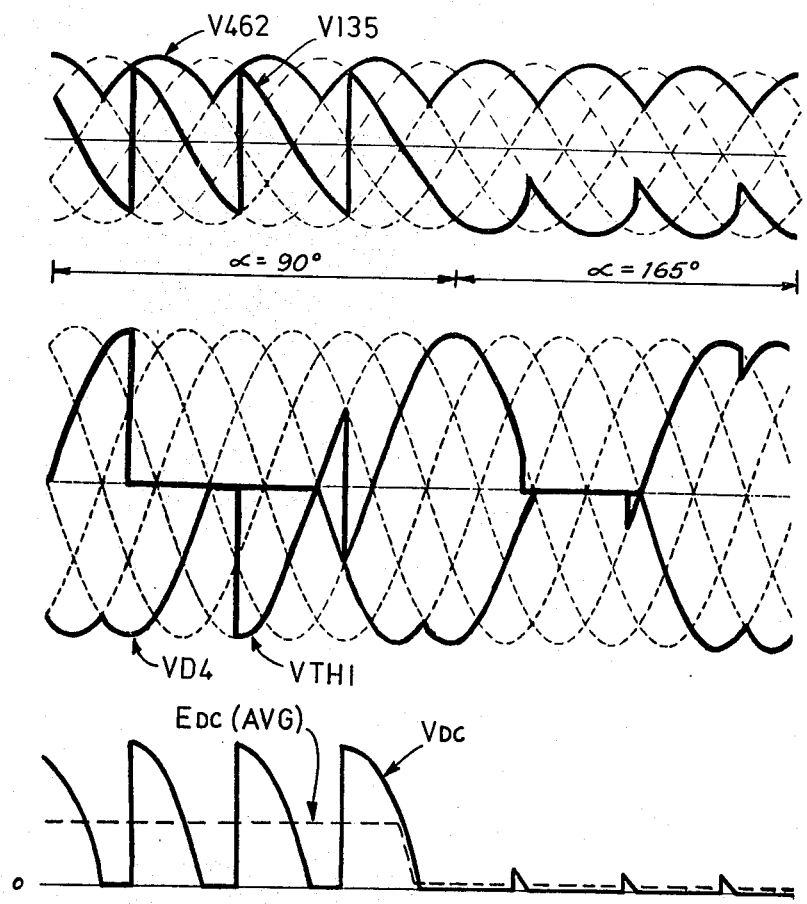
Figure 5E:
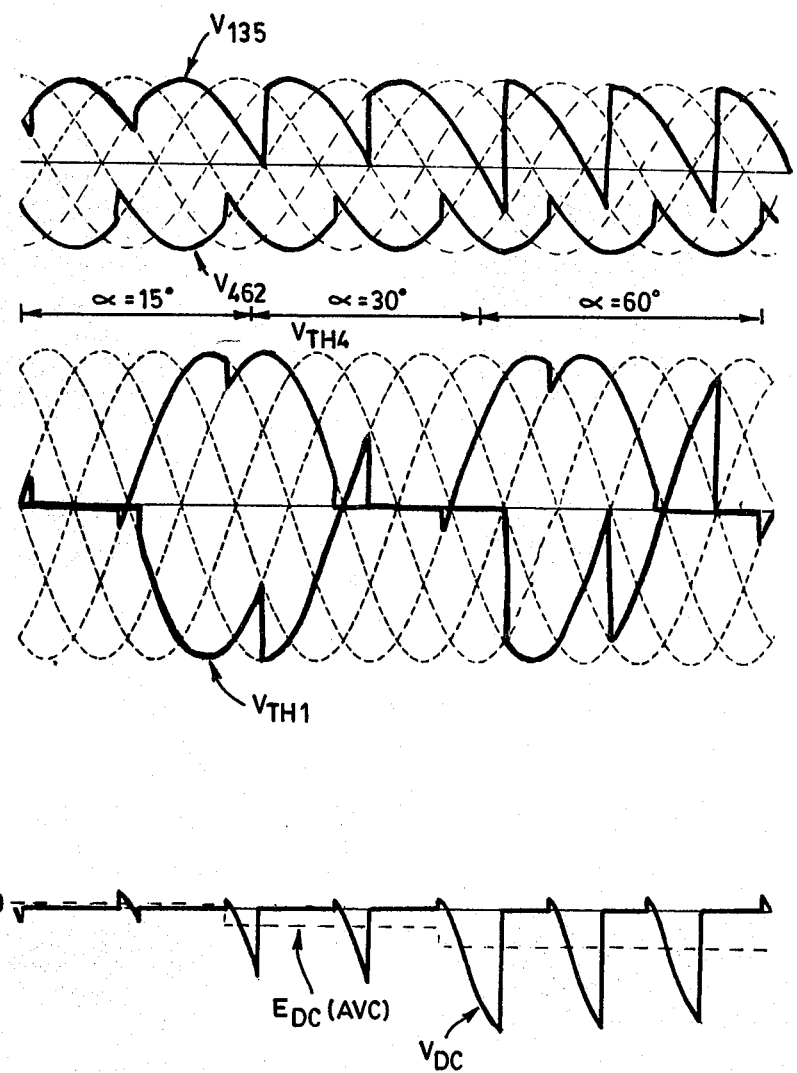
FIG. 5(e) and FIG. 5(f) show the AC supply current waveforms for the hybrid inverter of FIG. 2(c) for phase retardation angles varying from 15° to 165° with a constant direct current flowing.
Figure 5F:
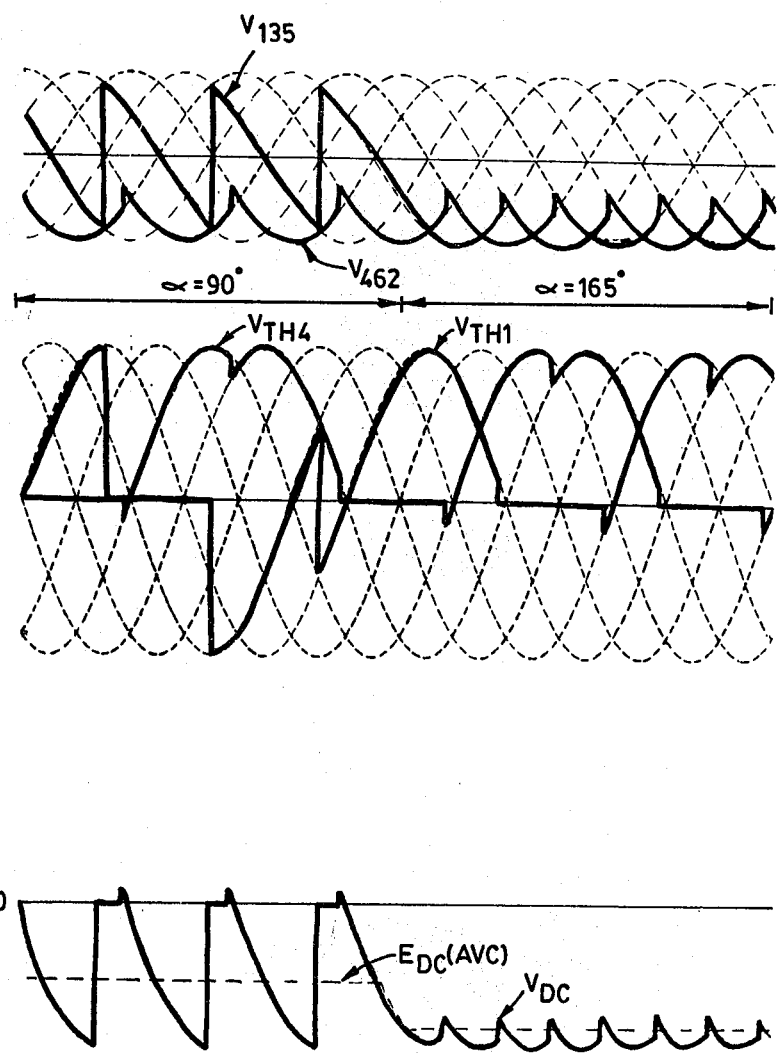

FIG. 5 shows the AC supply current waveforms for the six-pulse converter, FIGS. 5(a) and (b), the semi-converter, FIGS. 5(c) and (d) and the hybrid inverter, FIGS. 5(e) and (f) for phase retardation angles varying from 15° to 165° with a constant direct current flowing.

It will be noted that in the case of the full six-pulse converter, the waveform is of the same form irrespective of the phase angle α. Since this waveform is symmetrical under all conditions, a conventional AC current transformer can be used to extract this current waveform from the AC supply feeder. Full-wave rectification of a set of polyphase current waveforms will reconstruct the current flowing in the DC link. In the case of both the semi-converter and the hybrid inverter, however, the waveform departs significantly from the six-pulse case. In both cases part of the DC link current circulates through the bridge semi-conductors and does not flow in the AC supply line. Thus the current transformers located in the AC line no longer will be able to reconstruct the DC link current by rectification of the current waveforms.

Figure 6:
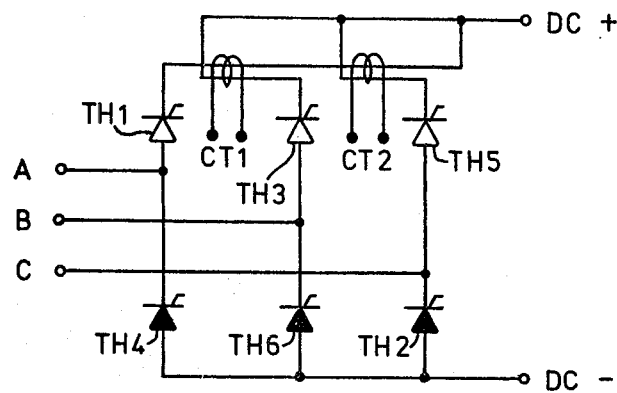
FIG. 6 shows alternating current transformer connections that can be employed usefully with a hybrid inverter of the present invention.

During the time when the direct current is not flowing in the line, it is flowing in a corresponding semi-conductor branch, so monitoring of the semi-conductor current will provide the necessary waveforms for DC current reconstruction. However, the semi-conductor current is unidirectional by nature and not suitable for use with a current transformer which requires an AC waveform. By reconnecting the thyristor branches containing thyristors TH1 to TH6 inclusive as shown in FIG. 6, AC current transformers CT1 and CT2 can be employed to reconstruct the DC link current by full wave rectification. Since the conductors passing through the current transformers CT1 and CT2 are all the same potential, a simple buswork assembly may be employed. This technique of current monitoring provides a predictable, accurate method of measuring the direct current in the three phase bridge and is effective for any type of bridge configuration. The isolation level is a function strictly of the insulation of the current transformer, whose secondary may be directly connected to the motor control logic.

GATING SIGNAL LOGIC

In a DC converter the DC output is characterized by the expression:

$$V_{DC} = V_{DM} \cos \alpha$$

where $V_{DM}$ is the peak supply voltage, $V_{DC}$ is the DC output voltage and α is the phase retardation angle for the thyristors (see FIG. 5).

If the control voltage $V_C$ which determines the delay angle α is constrained such that $$V_C/V_{CM} = \cos \alpha,$$

where $V_{CM} = V_C(\text{max.})$, then the over-all transfer characteristic of the power converter will be a linear relationship $$V_{DC} = V_C(V_{DM}/V_{CM})$$

In addition, if the gating signal logic reference waveform is derived from the same supply as the thyristor converter, the ratio $V_{DM}/V_{CM}$ will be constant and the DC output of the converter will be independent of AC line voltage variations.

Figure 7:
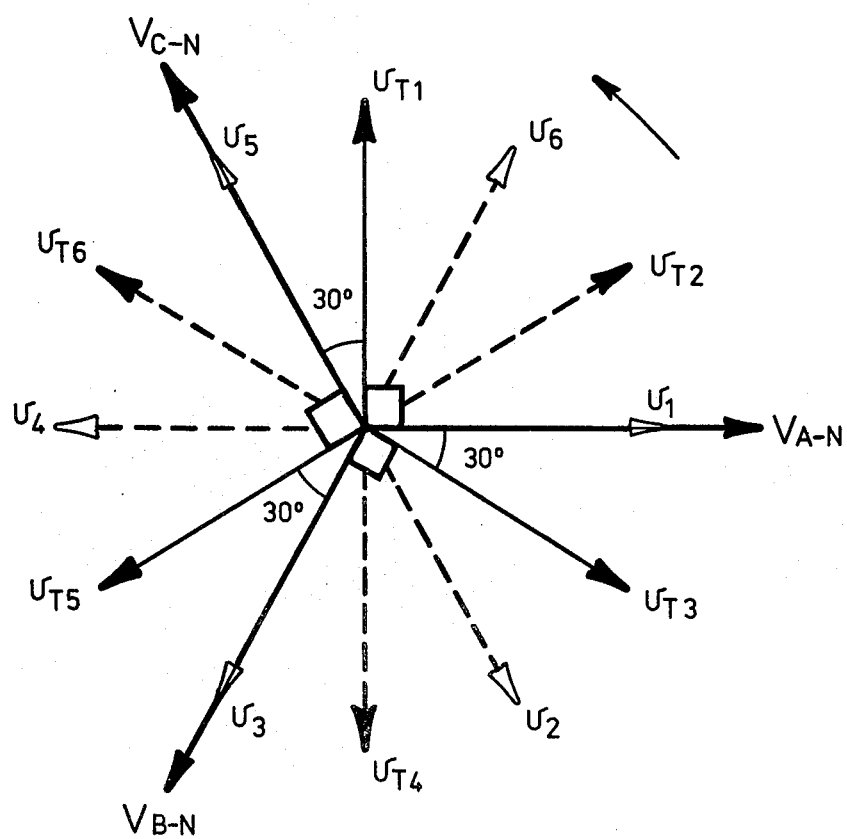
FIG. 7 is a vector diagram of various voltages shown in FIG. 8.

The required logic reference waveform, by virtue of its transfer function, $V_C = V_{CM} \cos \alpha$, must be a cosine function of the thyristor AC waveform and thus must be phase displaced 90° from it. Since three phase voltages are, by definition, phase displaced by 120°, there are no naturally occurring cosine waveforms available. However, if, for example, phase C is phase-shifted by 30° using a phase lag network, the resulting waveform will lead phase A by 90°. This is illustrated in FIG. 7. $V_{T1}$, which lags $V_{C-N}$ by 30°, leads $V_{A-N}$ by 90°. This waveform is used as the "cosine" wave to provide the reference waveform for the gating signal logic.

A circuit which detects the intersection between the cosine wave and a DC control voltage proportional to the desired DC output voltage will result in a logic signal which will be phase-displaced from the appropriate thyristor voltage by an angle α.

Figure 8:
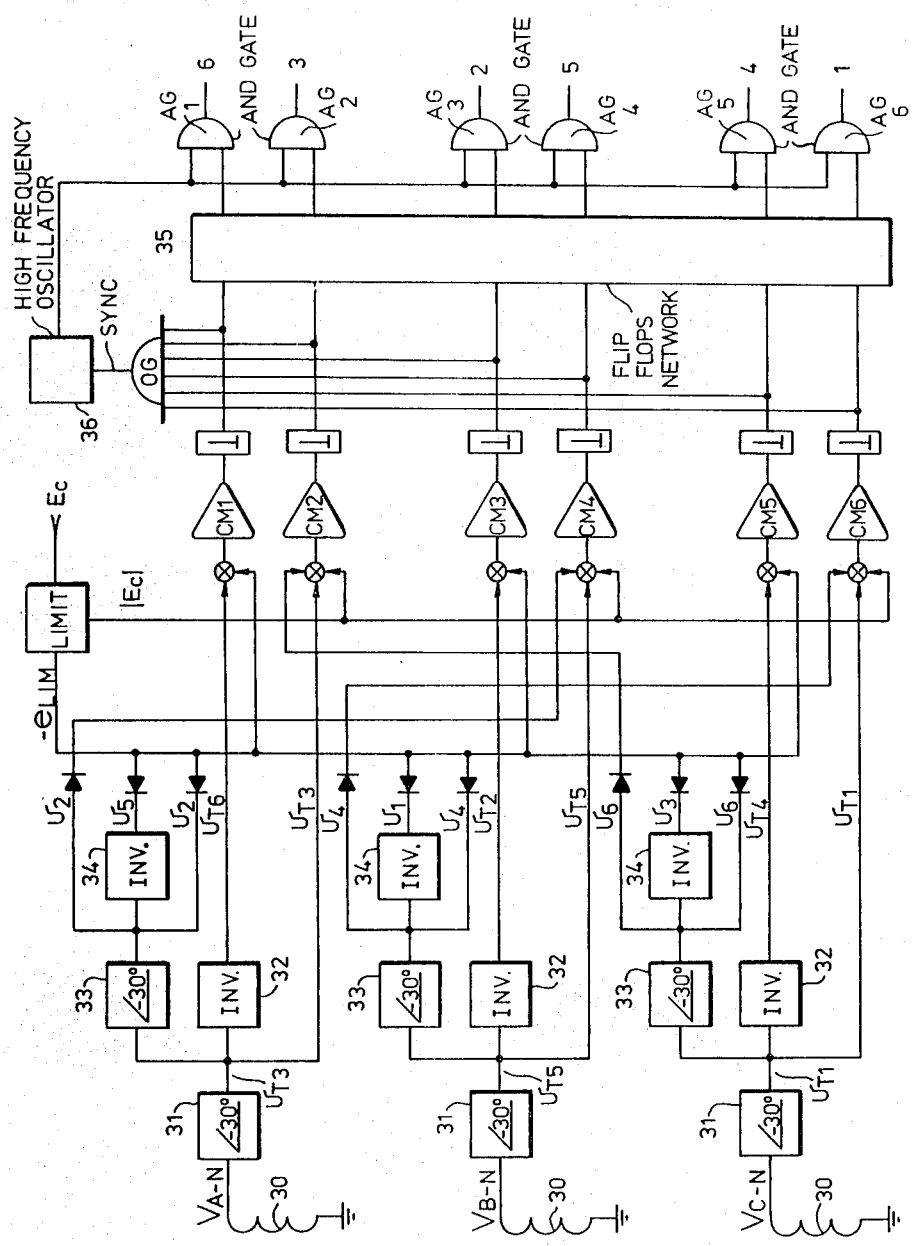
FIG. 8 illustrates a control logic system that may be employed to provide gating waveforms for a three-phase hybrid inverter embodying the present invention.

A control logic diagram which provides the gating waveforms for a three-phase hybrid inverter is shown in FIG. 8.

Three line-to-neutral voltages $V_{A-N}$, $V_{B-N}$, $V_{C-N}$, are generated from the Y-connected secondary 30 of a three phase logic supply transformer. These voltages are each phase-shifted by 30° by phase shift networks 31 and then inverted by inverters 32 to produce six 60° displaced cosine reference waveforms ($V_{T1}$ to $V_{T6}$), one for each thyristor gate signal. (See FIGS. 7 and 8).

By phase shifting voltages $V_{T1}$, $V_{T3}$ and $V_{T5}$ using 30° phase shifting networks 33 and inverting the phase shifted signals by inverters 34, another set of six 60° displaced waveforms are produced ($V_1$ to $V_6$) which are again in-phase with the line-neutral voltages. These voltages are rectified to produce a limit potential $e_{lim}$ which is used for phase retardation limiting as described hereinafter under "Phase Modulation Limits". The additional phase shifting is used in producing voltages $V_1$ to $V_6$ to provide the additional filtering inherent in this phase shifting function which removes spikes, harmonics and noise that can be present on the line-neutral voltages.

The comparators CM1 to CM6 in FIG. 8 compare the reference and control voltages on their inputs and produce a logic output signal at the point of intersection. This logic signal is transmitted in the form of a pulse to a flip-flop network 35 whose function is to produce 120° wide gate signal envelopes corresponding to the conducting period of each thyristor. These gate signals are produced in two sets, one for the three thyristors connected to the positive DC bus, (TH1, TH3 and TH5) and one for the three thyristors connected to the negative bus (TH2, TH4 and TH6).

Figure 5H:
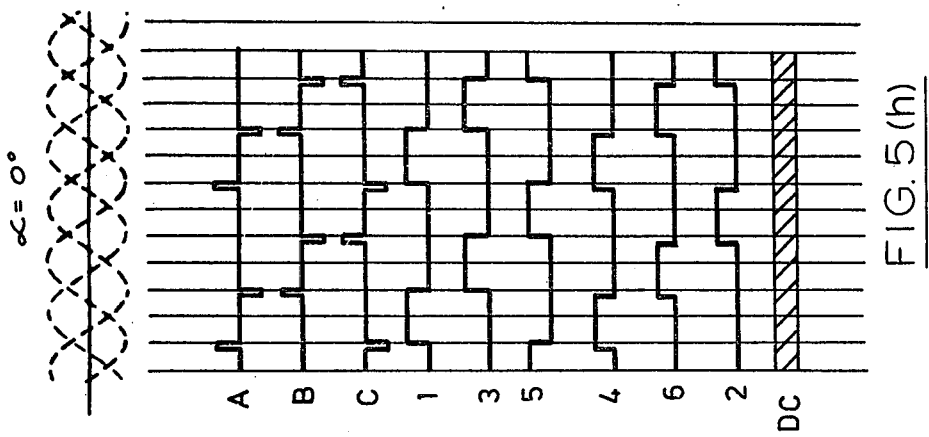
FIG. 5(h) depicts hybrid inverter waveforms for a phase retardation angle of 0°.
Figure 5G:
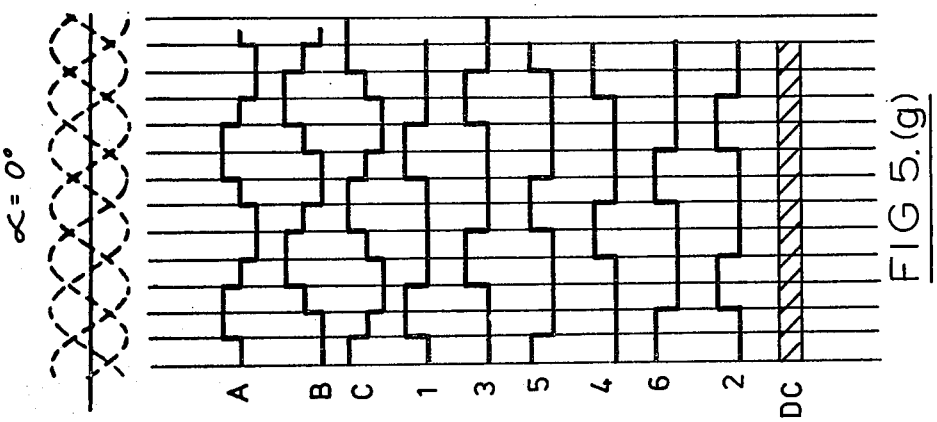
FIG. 5(g) depicts converter waveforms for a phase retardation angle of 0°.

The 120° gate signal envelopes, which are shown in FIG. 5(h), are modulated with a high frequency oscillator 36 by means of AND gates AG1 to AG6 to produce "bursts" of pulses which are amplified and directed to the gate terminals of the appropriate bridge thyristors.

PHASE MODULATION LIMITS

The production of the gate logic signals from the comparators CM1 to CM6 necessitates the detection of an intersection between the phase control signal $E_C$ (FIG. 8) and the cosine reference wave. To provide full-range control of $\alpha$, the amplitude of the control voltage $E_C$ must be sufficient to equal the extremes of the cosine reference wave excursions. If the amplitude of $E_C$ exceeds the cosine peak, no intersection takes place and the gating signal will not be produced. Since the cosine reference wave is derived from the AC supply voltage, it is also subject to variations in amplitude. Thus the limits applied to $E_C$ must insure an intersection independent of the cosine wave amplitude and still permit full range control of $\alpha$. It also is important, practically speaking, that the maximum angle be precisely limited to 165° to ensure successful "commutation" of the outgoing thyristor giving a "commutation angle" of (180°−165°)=15°.

MAXIMUM $\alpha$ LIMIT

By rectifying the six voltages $V_1$ to $V_6$ as described in the Gating Signal Logic section, a negative DC voltage $e_{lim}$ is produced whose peak amplitude is equal to the peak of the cosine voltages $V_{T1}$ to $V_{T6}$. However, because $V_1$ to $V_6$ are delayed 30° from $V_{T1}$ to $V_{T6}$ respectively, the rectified voltage $e_{lim}$ has its peak amplitude occurring 30° displaced from the peak amplitude of the cosine reference waveform. The intersection between these two waveforms (see FIG. 9) occurs at an $\alpha$ of 165°, and this intersection angle remains constant regardless of waveform amplitude, since $e_{lim}$ also is derived from the AC supply voltage.

By the use of a limiter circuit, the amplitude of $E_C$ may be limited in the negative direction to the absolute value of $e_{lim}$ so that irrespective of AC supply variations, $\alpha$ max is fixed. Thyristors TH1, TH3 and TH5 which are connected to the positive DC bus are phase controlled from $\alpha$ min to $\alpha$ max by means of the control voltage $E_C$.

On the other hand, thyristors TH4, TH6 and TH2 are connected to the negative DC bus and are operated in the full inversion mode continuously. This requires that the gating signal be phase delayed by a constant angle $\alpha$ max=165°. In this case the comparators only detect the intersection between the reference cosine waveform and the limit voltage $e_{lim}$. The resulting logic signal is employed to trigger the flip flops which, in turn generate three sequential 120° gating signals corresponding to the conduction periods of the thyristors.

MINIMUM $\alpha$ LIMIT

Thyristors TH1, TH3 and TH5 whose firing angle $\alpha$ is variable are phase controlled over the entire range from $\alpha$ min to $\alpha$ max. If a similar method to that used for $\alpha$ max limiting is employed for $\alpha$ min, the minimum reliable intersection which could be employed would be $\alpha$ min=15°. With this limitation on phase angle, however, the positive (or variable) half of the hybrid inverter cannot produce enough additional voltage to overcome the forward voltage drop of the inverting half of the hybrid inverter leaving a residual voltage across the DC terminals that prevents operation of the control at full rated speed. It is desired that the minimum firing angle $\alpha$ be 0°, but 0° corresponds to the peak of the cosine wave where the slope is zero, and no intersection can be achieved with a DC voltage. To achieve an intersection at this point, it is necessary to introduce a distinct discontinuity at zero degrees to ensure an intersection even though the control voltage $E_C$ exceeds the peak amplitude of the cosine wave. This is accomplished by summing a rectified sine wave with the cosine wave which effectively increases the amplitude of the cosine wave at zero degrees, permitting an intersection to occur for angles of 0° or even less. This technique ensures that $\alpha$ min occurs at 0° or earlier and that thyristors TH1, TH3 and TH5 can be gated into conduction at the very earliest possible moment.

Figure 9:
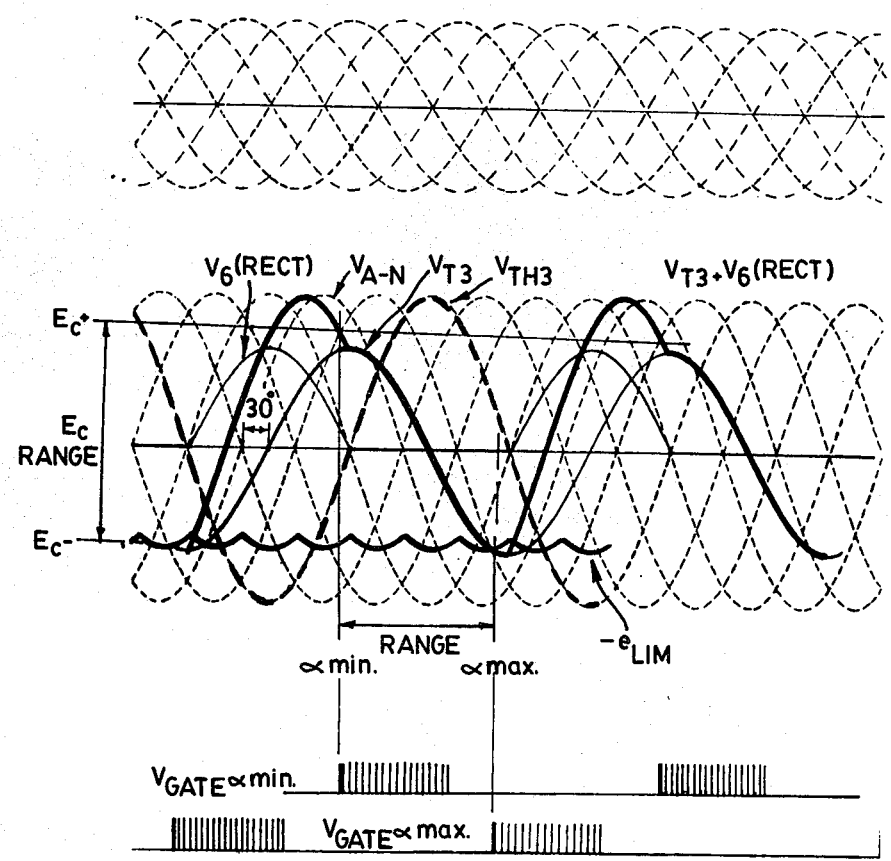
FIG. 9 illustrates the phase control and phase retardation angle ($\alpha$) limit waveforms associated with thyristor TH3 (FIGS. 2(c) and 6) and also shows the gating waveforms for $\alpha$ min. (less than 0°) and $\alpha$ max. (165°)

FIG. 9 illustrates the phase control and $\alpha$ limit waveforms associated with thyristor TH3 and showing the gating waveforms for $\alpha$ min (less than 0°) and $\alpha$ max (165°).

OVERALL SYSTEM

Figure 1:
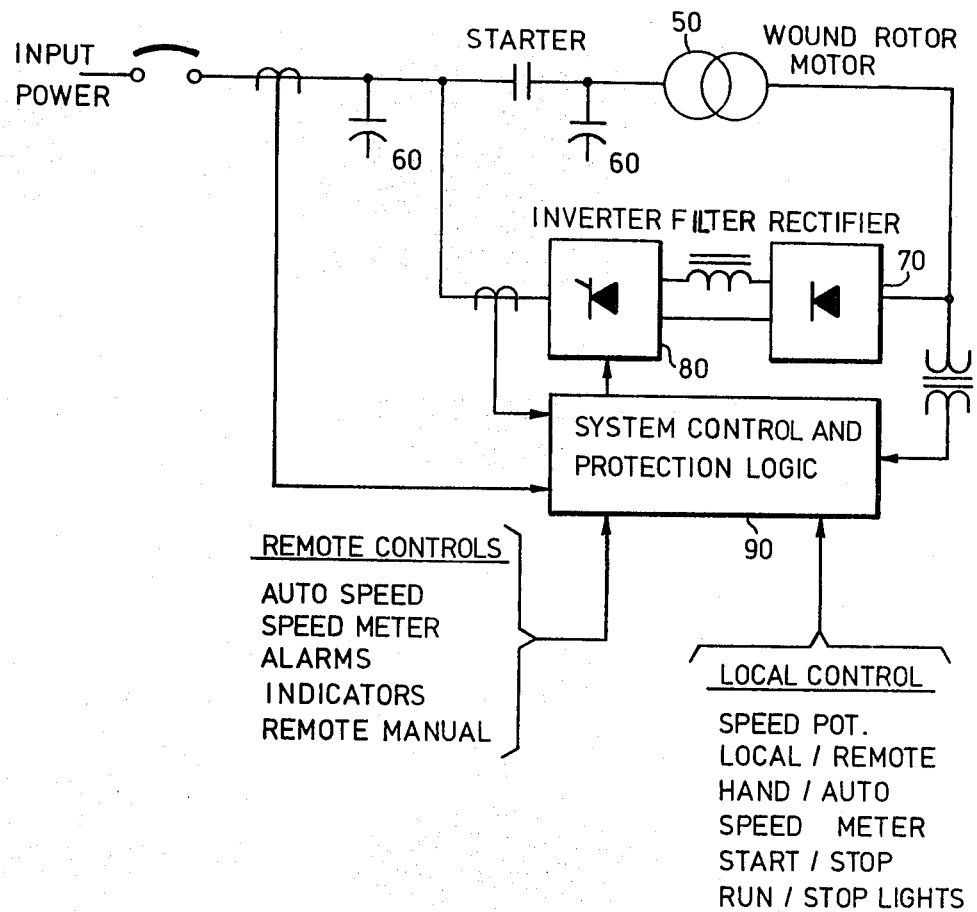
FIG. 1 is a block diagram of a slip energy recovery system.
Figure 10:
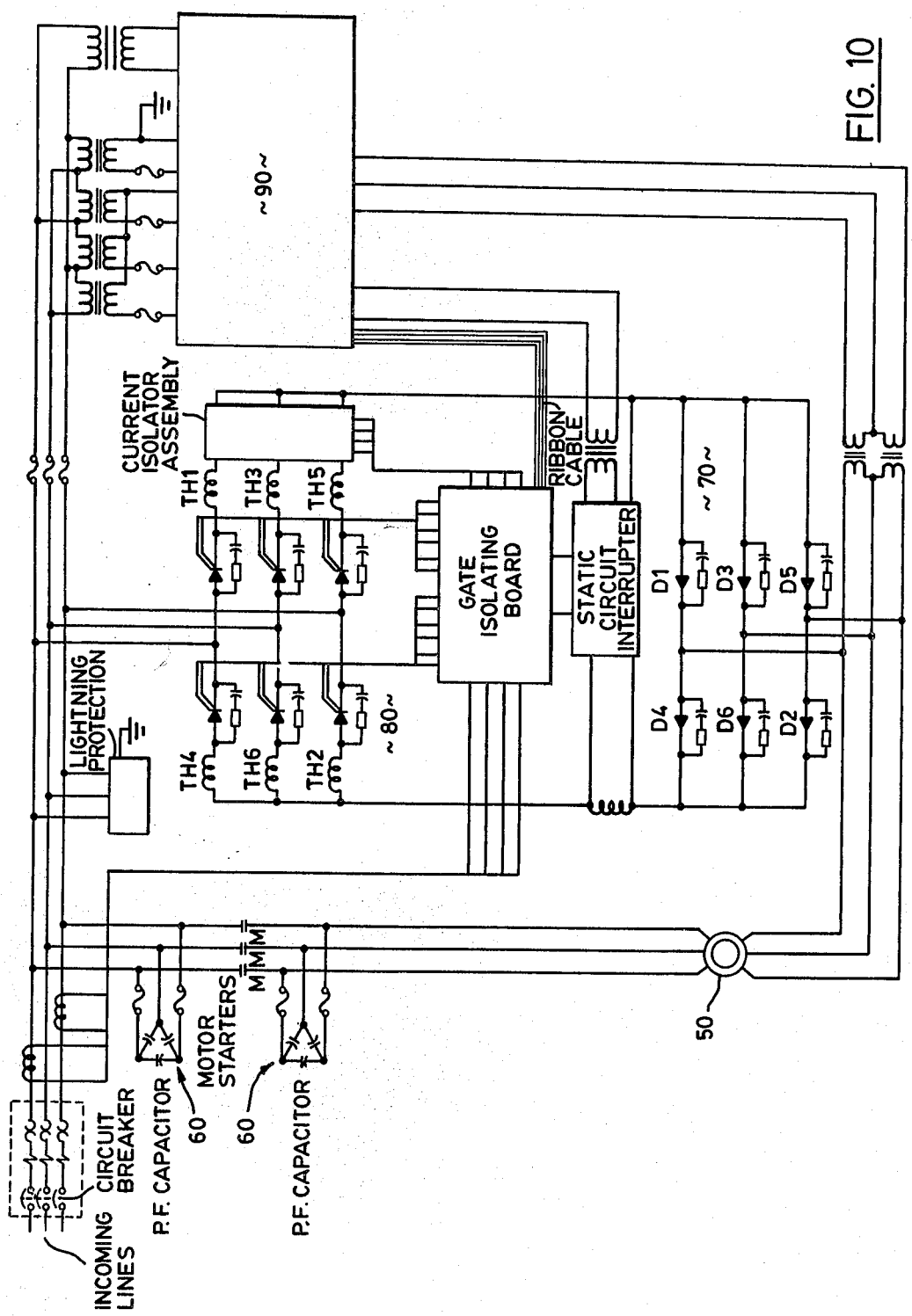
FIG. 10 is a complete system diagram in greater detail than that shown in FIG. 1.

A complete system diagram for a wound rotor motor controller embodying the present invention is constituted by FIG. 10. In that Figure and FIG. 1 the wound rotor motor is shown at 50, the power factor correcting capacitors at 60, the rectifier at 70, the hybrid inverter at 80 and the system control and protection logic at 90.

While preferred embodiments of the present invention have been disclosed herein, those skilled in the art will appreciate that changes and modifications can be made therein without departing from the spirit and scope of the invention as defined in the appended claims. Thus, for example, while a three phase system has been disclosed herein, the invention could be practised using a single phase. Also, while thyristors constitute the preferred devices for practising the present invention, other gate-controlled, bistable, unidirectional conducting devices could be employed.

The embodiments of the invention in which an exclusive property or privilege is claimed are defined as follows:

1. A slip energy recovery system for a wound rotor motor having an AC supply source of at least one phase: said system including rectifying means and a hybrid inverter each having the same number of phases as said source connected between the wound rotor of said motor and said source for converting AC power from said rotor to DC power and for inverting said DC power to AC power for delivery to said source, said hybrid inverter including in each phase thereof first and second groups of gate-controlled, bistable, unidirectional conducting devices; and means for controlling the operation of said first and second groups of bistable unidirectional conducting devices in each said phase of said hybrid inverter such that said first bistable unidirectional conducting device group is continuously in the inversion mode and gated into conduction at a fixed firing angle while said second bistable unidirectional conducting device group is gated into conduction at a second firing angle of from 0° to 180°, whereby said hybrid inverter produces zero quadrature current at full speed of said motor, zero volts at maximum motor current and maximum volts at zero motor current.

2. A slip energy recovery system according to claim 1 wherein said unidirectional conducting devices are thyristors.

3. A slip energy recovery system according to claim 1 wherein said rectifying means are diodes.

4. A slip energy recovery system according to claim 2 wherein said rectifying means are diodes.

5. A slip energy recovery system according to claim 1 wherein said second firing angle is from 0° to 165°.

6. A slip energy recovery system according to claim 1 wherein said fixed firing angle is 165°.

7. A slip energy recovery system according to claim 6 wherein there are three of said phases.

8. A slip energy recovery system according to claim 7 wherein said second firing angle is from 0° to 165°.

9. A slip energy recovery system according to claim 1 wherein there are three of said phases.

* * * * *